(12) United States Patent
Tai et al.

(10) Patent No.: US 10,690,970 B2
(45) Date of Patent: Jun. 23, 2020

(54) DISPLAY WITH HYBRID COLUMN SPACER STRUCTURES

(71) Applicant: Apple Inc., Cupertino, CA (US)

(72) Inventors: Chia Hsuan Tai, Sunnyvale, CA (US); Cheng Chen, San Jose, CA (US); Da Yu, San Jose, CA (US); Enkhamgalan Dorjgotov, San Francisco, CA (US); Sang Un Choi, San Jose, CA (US); Shih-Chyuan Fan Jiang, Cupertino, CA (US); Tae Woon Cha, Cupertino, CA (US); Yeon Sik Ham, Cupertino, CA (US); Yuan Chen, Santa Clara, CA (US); Zhibing Ge, Sunnyvale, CA (US); Hossein Nemati, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 15/260,082

(22) Filed: Sep. 8, 2016

(65) Prior Publication Data
US 2017/0293174 A1    Oct. 12, 2017

Related U.S. Application Data

(60) Provisional application No. 62/320,374, filed on Apr. 8, 2016.

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1368* (2013.01); *G02F 1/13439* (2013.01);
(Continued)

(58) Field of Classification Search
CPC ..... G02F 1/13394; G02F 2001/133357; G02F 1/1339; G02F 1/13396
See application file for complete search history.

(56) References Cited

U.S. PATENT DOCUMENTS

| 5,777,707 A | 7/1998 | Masaki et al. |
| 9,036,103 B2 | 5/2015 | Kim et al. |

(Continued)

FOREIGN PATENT DOCUMENTS

| CN | 102566145 A | 7/2012 |
| CN | 104849919 A | 8/2015 |

(Continued)

*Primary Examiner* — Michael H Caley
*Assistant Examiner* — Jonathan Y Jung
(74) *Attorney, Agent, or Firm* — Treyz Law Group, P.C.; G. Victor Treyz; Matthew R. Williams (57) ABSTRACT

A liquid crystal display may have main column spacers and subspacer column spacers. The column spacers may have cross shapes formed from overlapping perpendicular rectangular column spacer portions respectively located on a color filter layer and a thin-film transistor layer. The column spacers may have a hybrid configuration in which some of the rectangular portions on the thin-film transistor layer extend vertically and some extend horizontally. Column spacers may be formed from planarization layer material, may be formed from locally thickened portions of a planarization layer, and may have circular shapes.

16 Claims, 11 Drawing Sheets

(51) Int. Cl.
*G02F 1/1337* (2006.01)
*G02F 1/1343* (2006.01)
*G02F 1/1368* (2006.01)
G02F 1/1362 (2006.01)
G02F 1/1333 (2006.01)
G02F 1/137 (2006.01)
G06F 3/041 (2006.01)

(52) U.S. Cl.
CPC .. *G02F 1/133514* (2013.01); *G02F 1/133711* (2013.01); *G02F 1/137* (2013.01); *G02F 1/13338* (2013.01); *G02F 1/133528* (2013.01); *G02F 1/136227* (2013.01); *G02F 1/136286* (2013.01); *G02F 2001/13398* (2013.01); *G02F 2001/133357* (2013.01); *G02F 2201/123* (2013.01); *G06F 3/0412* (2013.01)

(56) References Cited

U.S. PATENT DOCUMENTS

| | | |
|---|---|---|
| 2004/0223109 A1 | 11/2004 | Taniguchi et al. |
| 2005/0128382 A1 | 6/2005 | Baek et al. |
| 2006/0001823 A1 | 1/2006 | Shih |
| 2006/0215070 A1 | 9/2006 | Taniguchi et al. |
| 2010/0033646 A1* | 2/2010 | Baek ................ G02F 1/1345 349/42 |
| 2011/0090436 A1* | 4/2011 | Choi ................ G02F 1/133345 349/106 |
| 2012/0138941 A1 | 6/2012 | Xu et al. |
| 2013/0169901 A1 | 7/2013 | Kim et al. |
| 2013/0235294 A1* | 9/2013 | Nomura ............ G02F 1/133345 349/43 |
| 2013/0257700 A1* | 10/2013 | Chang ............... G02F 1/134363 345/87 |
| 2014/0307207 A1* | 10/2014 | Ge ...................... G02F 1/13394 349/106 |
| 2014/0376121 A1 | 12/2014 | Kim |
| 2015/0309349 A1 | 10/2015 | Hatakeyama |
| 2015/0309358 A1* | 10/2015 | Nomura ............ G02F 1/13394 349/42 |
| 2015/0346533 A1* | 12/2015 | Park .................. G02F 1/13394 349/42 |
| 2015/0370115 A1 | 12/2015 | Ge et al. |
| 2016/0231617 A1 | 8/2016 | Hong et al. |
| 2017/0023824 A1* | 1/2017 | Kim .................. G02F 1/13394 |
| 2017/0176802 A1* | 6/2017 | Higano ............. G02F 1/13394 |

FOREIGN PATENT DOCUMENTS

| | | |
|---|---|---|
| CN | 206863431 U | 1/2018 |
| JP | 2002014373 A | 1/2002 |

* cited by examiner

DISPLAY WITH HYBRID COLUMN SPACER STRUCTURES

This application claims the benefit of provisional patent application No. 62/320,374, filed Apr. 8, 2016, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel.

Substrate layers such as color filter layers and thin-film transistor layers are used in liquid crystal displays. The thin-film transistor layer contains an array of the thin-film transistors that are used in controlling electric fields in the liquid crystal layer. The color filter layer contains an array of color filter elements such as red, blue, and green elements. The color filter layer provides the display with the ability to display color images.

In an assembled display, the layer of liquid crystal material is sandwiched between the thin-film transistor layer and the color filter layer. Alignment layers for aligning liquid crystals in the liquid crystal material cover the inner surface of the color filter layer and the upper surface of the thin-film transistor layer. An array of column spacers is formed in the liquid crystal layer between the color filter layer and the thin-film transistor layer to maintain a desired gap between the color filter layer and the thin-film transistor layer.

It can be challenging to design column spacers for a liquid crystal display. If care is not taken, the column spacers may not be sufficiently strong or may allow the alignment layers or other structures in a display to become damaged during use of the display.

SUMMARY

A display may have a color filter layer and a thin-film transistor layer. A layer of liquid crystal material may be located between the color filter layer and the thin-film transistor layer. Column spacers may be formed in the liquid crystal layer.

The column spacers may include color filter layer column spacer portions on the color filter layer and associated thin-film-transistor layer column spacer portions on the thin-film transistor layer. The column spacers may include main column spacers and subspacers and may be used to maintain a desired gap between the color filter and thin-film transistor layers and protect the inner surfaces of the color filter and thin-film transistor layers.

The column spacers may have cross shapes formed from overlapping perpendicular elongated portions on the color filter layer and thin-film transistor layer. The column spacers may have a hybrid configuration in which some of the rectangular portions on the thin-film transistor layer extend vertically and some extend horizontally.

Column spacers may be formed from planarization layer material, may be formed from locally thickened portions of a planarization layer, and may have circular shapes.

DETAILED DESCRIPTION

Figure 1:
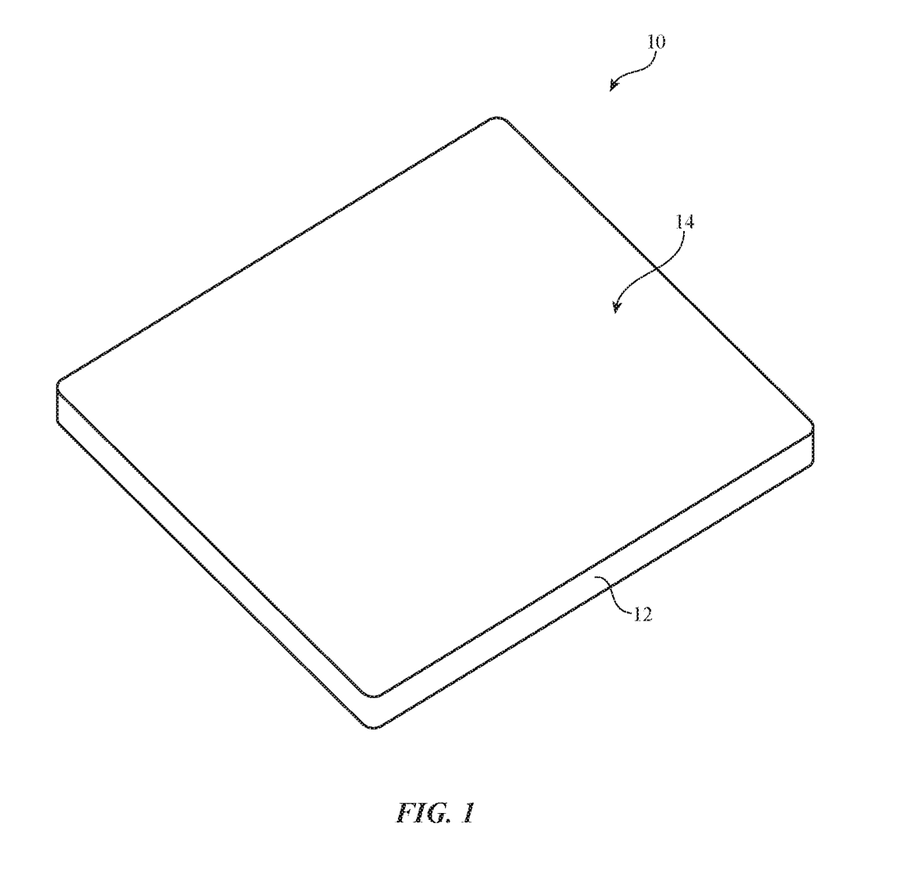
FIG. 1 is a perspective view of an illustrative electronic device with a display in accordance with an embodiment.

Electronic devices may include displays. The displays may be used to display images to a user. An illustrative electronic device with a display is shown in FIG. 1. As shown in FIG. 1, electronic device 10 may have a housing such as housing 12. Display 14 may be mounted in housing 12.

Electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 may be a liquid crystal display or other suitable display. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 2:
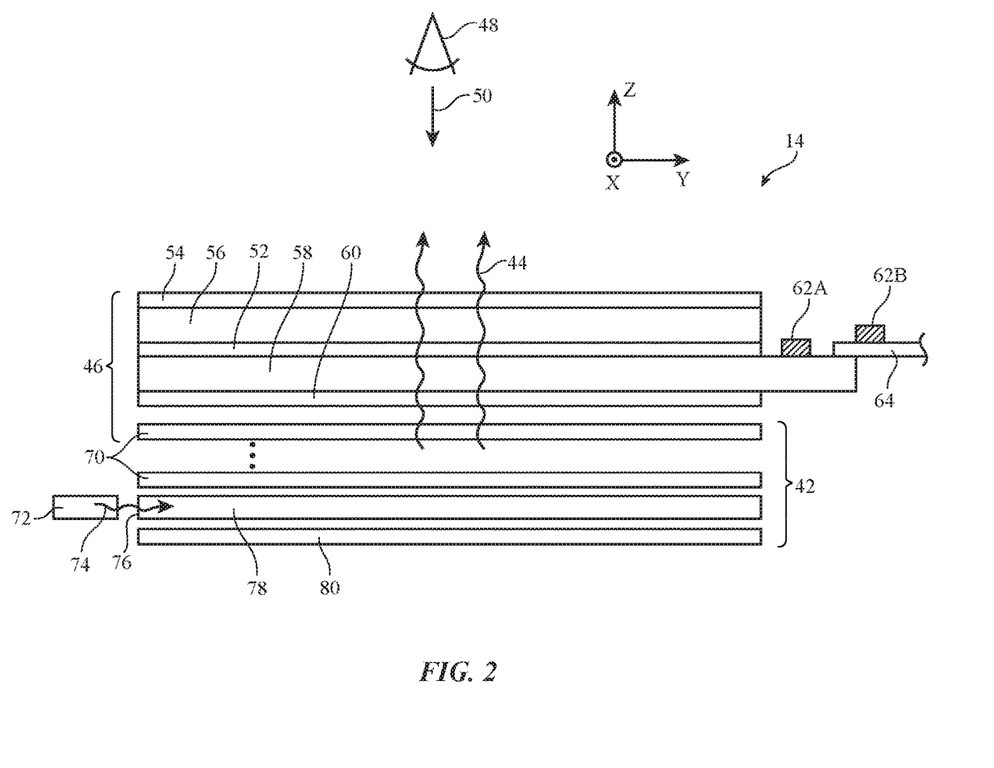
FIG. 2 is a cross-sectional side view of an illustrative display in accordance with an embodiment.

A cross-sectional side view of an illustrative configuration for display 14 of device 10 is shown in FIG. 2. As shown in FIG. 2, display 14 may include backlight structures such as backlight unit 42 for producing backlight 44. During operation, backlight 44 travels outwards (vertically upwards in dimension Z in the orientation of FIG. 2) and passes through pixels in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which layer 56 includes both color filter elements and thin-film transistor structures and in which layer 58 is a clear substrate layer may also be used. Configurations in which layer 56 is a color filter layer and layer 58 is a thin-film transistor layer are sometimes described herein as an example.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upward direction by reflector 80. Reflector 80 may be formed from a reflective material such as a layer of white plastic, a dielectric stack that forms a mirror coating on a carrier film, or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 2, optical films 70 and reflector 80 may have a matching rectangular footprint. If desired, compensation films may be incorporated into other layers in display 14 (e.g., a polarizer layer).

Display 14 may include an array of pixels. The pixels may be controlled using control signals produced by display driver circuitry. Display driver circuitry may be implemented using one or more integrated circuits (ICs) and/or thin-film circuitry (e.g., thin-film circuitry on layer 58).

During operation of device 10, control circuitry in device 10 such as memory circuits, microprocessors, and other storage and processing circuitry may provide data to the display driver circuitry. The display driver circuitry may convert the data into signals for controlling the pixels of display 14. Display 14 may contain rows and columns of pixels. The pixels may be controlled using signals such as data line signals on data lines and gate line signals on gate lines.

The pixels may contain thin-film transistor circuitry and associated structures for producing electric fields across liquid crystal layer 52 in display 14. Each pixel may have a respective thin-film transistor to control the application of a voltage to a set of electrodes and thereby control electric fields applied to a respective pixel-sized portion of liquid crystal layer 52.

The thin-film transistor structures that are used in forming the pixels of display 14 may be located on a substrate such as a layer of glass. The substrate and the structures of the pixels that are formed on the surface of the thin-film transistor substrate collectively form thin-film transistor layer 58.

Gate driver circuits in the display driver circuitry may be used to generate gate signals on gate lines in display 14. The gate driver circuitry may be formed from thin-film transistors on thin-film transistor layer 58 or may be implemented in separate integrated circuits. Gate driver circuitry may be located on both the left and right sides of the array of pixels in display 14 or on one side of the pixel array.

The data line signals on the data lines of display 14 carry analog image data (e.g., voltages with magnitudes representing pixel brightness levels). The data line signals on the data lines are distributed to the columns of pixel. Gate line signals on gate lines that run perpendicular to the data lines are provided to the rows of pixels. During operation of display 14, gate line signals may be asserted in sequence to load successive rows of pixels with image data. Storage capacitors in the pixels may be used to retain data between frames. Electrodes in each pixel may be used to apply electric files to liquid crystal layer 52. The electric field that is produced across liquid crystal material 52 causes a change in the orientations of the liquid crystals in liquid crystal material. This changes the polarization of light passing through liquid crystal material in the pixel associated with the electrodes. The change in polarization may, in conjunction with polarizers 60 and 54 of FIG. 2, be used in controlling the amount of light 44 that is transmitted through each pixel of display 14.

Figure 3:
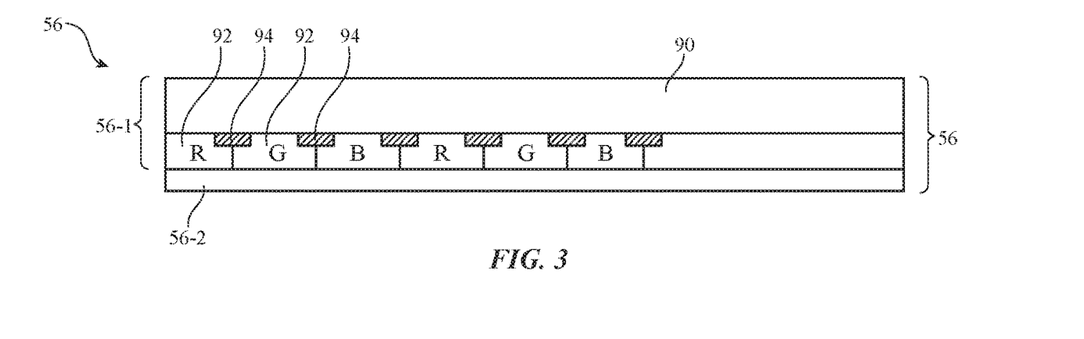
FIG. 3 is a cross-sectional side view of an illustrative color filter layer in accordance with an embodiment.

A cross-sectional side view of an illustrative color filter layer is shown in FIG. 3. As shown in FIG. 3, color filter layer 56 may have a color filter layer substrate such as substrate 90 (e.g., a layer of clear glass or transparent plastic, etc.). An array of color filter elements 92 may be formed in openings in black matrix 94. Color filter elements 92 may include red, green, and blue color filter elements or color filter elements of other colors. Each color filter element imparts color to the light exiting a respective pixel in display 14. Color filter elements 92 and substrate 90 (sometimes collectively referred to as color filter layer 56-1) may be coated with a polymer alignment layer such as alignment layer 56-2. Alignment layer 56-2 may be processed so that alignment layer 56-2 imparts a desired liquid crystal alignment to the liquid crystals in layer 52 when layer 56 is used in display 14 (i.e., layer 56-2 may serve as a liquid crystal alignment layer).

Figure 4:
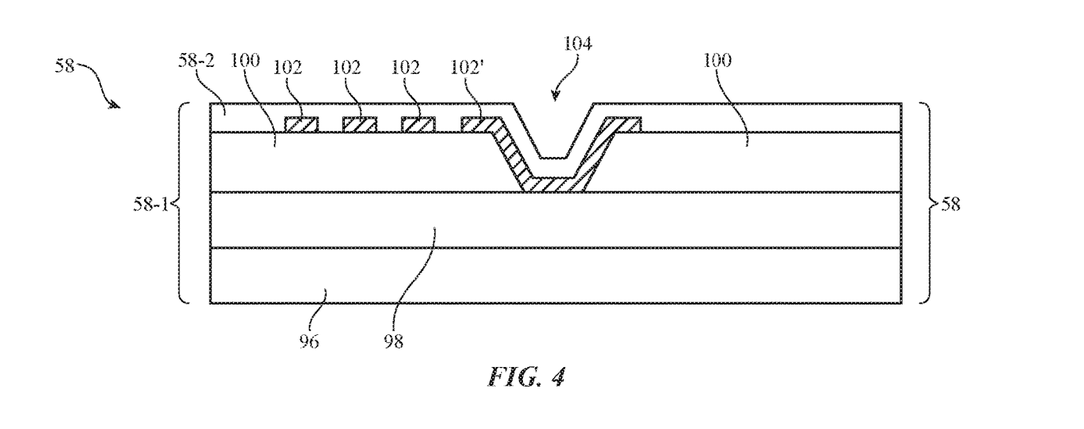
FIG. 4 is a cross-sectional side view of an illustrative thin-film transistor layer in accordance with an embodiment.

A cross-sectional side view of a portion of thin-film transistor layer 58 is shown in FIG. 4. As shown in FIG. 4, thin-film transistor layer 58 may include substrate 96 (e.g., a transparent glass substrate layer, a layer of clear plastic, etc.). Thin-film circuitry for forming pixel circuits for the pixels of display 14 may be formed on substrate 96. This circuitry may include thin-film circuitry layer 98, planarization layer 100, and structures such as pixel electrodes 102. Thin-film circuitry 98 may be used in forming thin-film transistors, capacitors, and other circuitry. In the active area of display 14 that contains pixels, circuitry 98 may form pixel circuits. In the inactive border regions of display 14, circuitry 98 may form display driver circuitry (e.g., thin-film gate driver circuitry, etc.).

Planarization layer 100 may be deposited as a polymeric liquid and cured to form a polymer planarization layer. Electrodes 102 may include multiple chevron-shaped fingers or other electrode structures for applying electric fields to liquid crystal layer 52. Indium tin oxide or other transparent conductive materials may be used in forming electrodes 102. Openings may be formed in planarization layer 100 such as contact hole opening 104. A transistor terminal may be located at the bottom of hole 104 and may be contacted by conductive indium tin oxide structures 102', which short the transistor terminal to electrodes 102. Substrate 96, thin-film circuitry 98, and planarization layer 100, which may sometimes be collectively referred to as thin-film transistor layer 56-1, may be coated with a polymer that serves as liquid crystal alignment layer 58-2.

Figure 5:
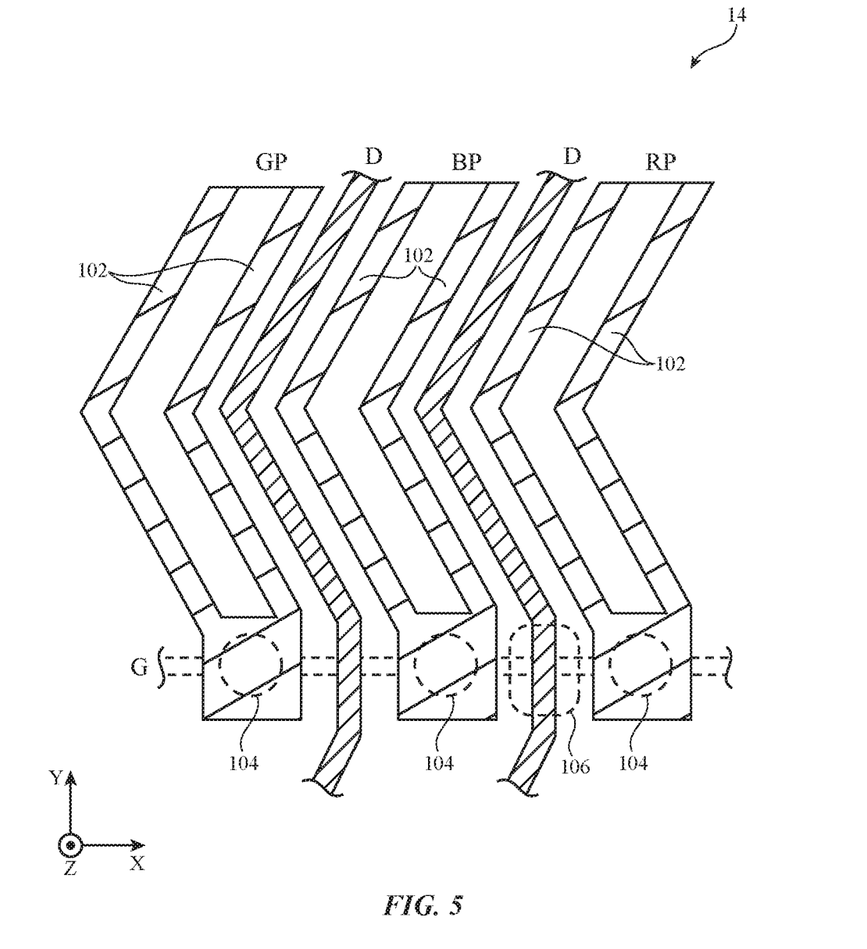
FIG. 5 is a top view of thin-film circuitry for three illustrative pixels in a display in accordance with an embodiment.

FIG. 5 is a top view of a portion of display 14 showing where contact holes 104 may be located relative to electrodes 102 in three illustrative pixels (e.g. green pixel GP, blue pixel BP, and red pixel RP) in display 14. FIG. 5 also shows illustrative locations for data lines D and gate lines G. Areas such as illustrative area 106 (e.g., an area between blue and red pixel contact holes 104) or other suitable areas of display 14 may be provided with column spacers that prevent direct contact between the inner surfaces of color filter layer 56 and thin-film transistor layer 58.

The column spacers may be distributed more sparsely than the pixels of display 14. For example, there may be a main column spacer (i.e., a spacer that completely spans layer 52 between layers 56 and 58) every 40-50 pixels in display 14. The column spacers may also include subspacers (i.e., spacers that do not completely span layer 52 except when layer 52 is compressed by applied pressure on display 14). There may be 10-20 subspacer column spacers for every 45 pixels in display 14. Other densities of column spacers may be used, if desired.

Figure 6:
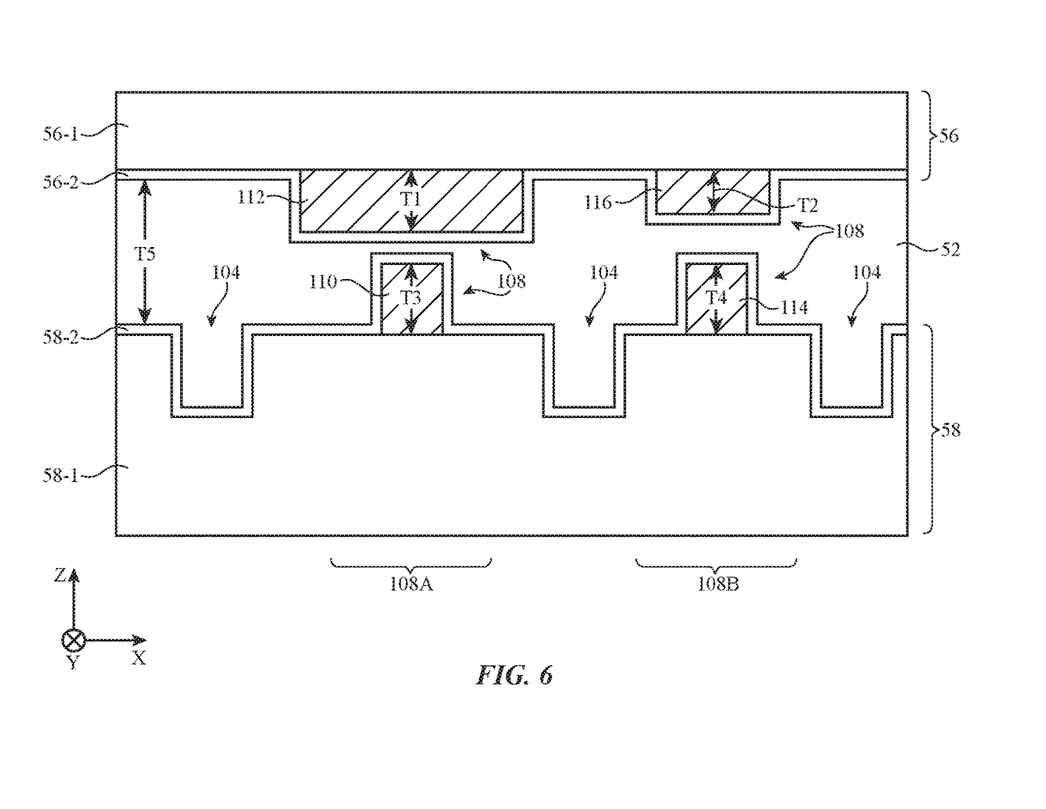
FIG. 6 is a cross-sectional side view of an illustrative display with column spacers in accordance with an embodiment.
Figure 14:
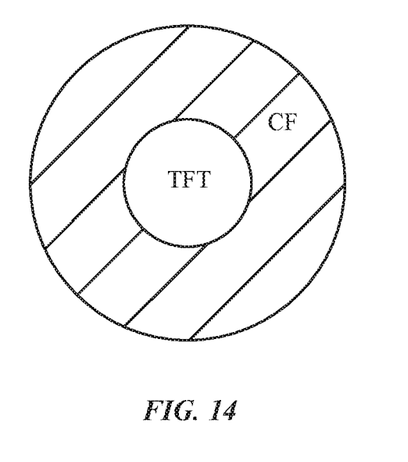
FIG. 14 is a top view of an illustrative circular column spacer in accordance with an embodiment.

FIG. 6 is a cross-sectional side view of an illustrative display with column spacers. As shown in FIG. 14, display 14 may have a color filter layer 56, a thin-film transistor layer 58, and liquid crystal layer 52 between layers 56 and 58. Column spacers 108 may be used to prevent direct contact between the inner surface of layer 56 and the opposing inner surface of layer 58. Direct contact could lead to scratching of alignment layers 58-2 and 56-2 and other damage.

Column spacers 108 may include main column spacers such as main column spacer 108A. Main column spacer 108A may have a thin-film transistor layer column spacer portion 110 of height T3 and an opposing color filter layer column spacer portion 112 of height T1. Portions 110 and 112 normally contact each other as shown in FIG. 6 and maintain a desired cell gap (thickness T5) between layers 56 and 58. Column spacers 108 may also include subspacers such as subspacer 108B. Subspacer 108B may include thin-film transistor layer sub spacer column spacer portion 114 of height T4 and a corresponding color filter layer subspacer column spacer portion 108 of height T2. The magnitude of T1 plus T3 establishes cell gap T5. The magnitude of T2 plus T4 is less than T1 plus T3 (i.e., column spacer portions 114 and 108 do not normally touch each other unless force is being applied to display 14). In general, T1, T2, T3, and T4 may have any suitable magnitudes. As one example, T5 may be 1.7 to 1.8 microns (or more than 1 micron or less than 3 microns), T1 may be 1.7 microns (or more than 1 micron or less than 2 microns), T3 may be 1.5 to 2 microns (or more than 1 micron or less than 3 microns), T2 may be 1.3 microns (or more than 1 micron or less than 2 microns), T4 may be 1.8 microns or more than 1 or less than 3 microns, etc.

Figure 7:
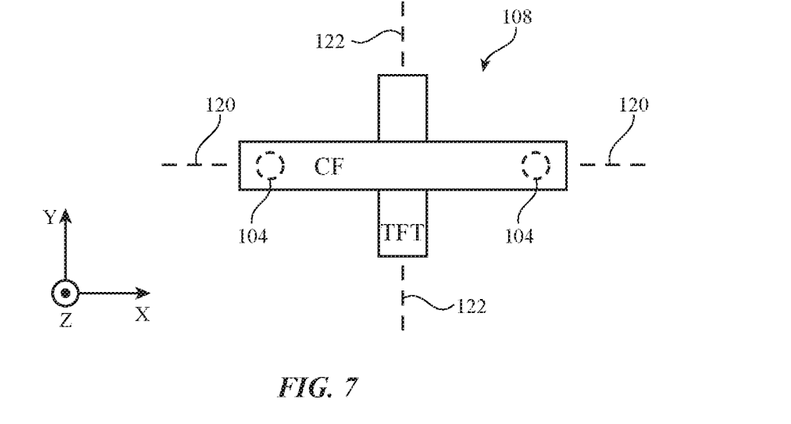
FIG. 7 is a top view of an illustrative column spacer having a vertically extending thin-film transistor layer column spacer portion and a horizontally extending color filter layer column spacer portion in accordance with an embodiment.
Figure 8:
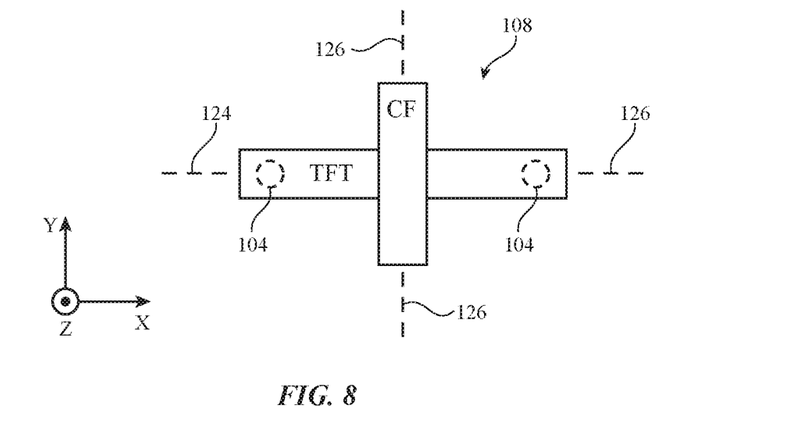
FIG. 8 is a top view of an illustrative column spacer having a horizontally extending thin-film transistor layer column spacer portion and a vertically extending color filter layer column spacer portion in accordance with an embodiment.

The column spacer portions that form column spacers 108 may have elongated shapes (e.g., rectangular shapes) that extend vertically (along lateral dimension Y when display 14 is viewed from the top) or that extend horizontally (along lateral dimension X when display 14 is viewed from the top). These perpendicular column spacer portions may cross over each other so that the outline (footprint) of column spacers 108 has a cross shape when viewed from above, as shown in FIGS. 7 and 8. Configurations in which the thin-film transistor layer column spacer portion (e.g., portion 110 or portion 114 of FIG. 6) of a main column spacer or subspacer extends vertically while the color filter layer column spacer portion (e.g., portion 112 or portion 116 of FIG. 6) of a main column spacer or subspacer extends horizontally may sometimes be referred to as "vertical bump" column spacers. Configurations in which the thin-film transistor layer column spacer portion (e.g., portion 110 or portion 114 of FIG. 6) of a main column spacer or subspacer extends horizontally while the color filter layer column spacer portion (e.g., portion 112 or portion 116 of FIG. 6) of a main column spacer or subspacer extends vertically may sometimes be referred to as "horizontal bump" column spacers.

Column spacer portions may be rectangular or may have other shapes. Rectangular column spacers may have narrower lateral dimensions (widths) of about 7-10 microns, more than 5 microns, or less than 15 microns) and may have longer lateral dimensions (lengths) of about 15-50 microns, more than 10 microns, or less than 50 microns).

An illustrative vertical bump column spacer is shown in FIG. 7. The column spacer portion on layer 58 (labeled "TFT") has longitudinal axis 122 running parallel to vertical dimension Y and the column spacer portion on layer 56 (labeled "CF") has longitudinal axis 120 running parallel to horizontal dimension X.

An illustrative horizontal bump column spacer is shown in FIG. 8. The column spacer portion on layer 58 (labeled "TFT") has longitudinal axis 124 running parallel to horizontal dimension X and the column spacer portion on layer 56 (labeled "CF") has longitudinal axis 126 running parallel to vertical dimension Y.

Display 14 may have any suitable combination of vertical and/or horizontal bump column spacers for forming its main column spacers and/or subspacers. The vertical bump configuration may exhibit better mechanical strength than the horizontal bump configuration, so it may be desirable to use the vertical bump configuration in forming the main column spacers. There is a relatively large step in height between the top of the thin-film transistor layer column spacer portion and the bottom of contact holes 104 in vertical bump designs, which can cause some of the polymer that forms layer 58-2 to enter contact holes 104 and produce non-uniformity in layer 58-2 that results in undesired visible artifacts. Horizontal bump designs can be configured so that the thin-film-transistor layer column spacer portion covers and therefore fills contact holes 104, reducing non-uniformity in layer 58-2. In view of these considerations, it may be desirable for display 14 to have a hybrid column spacer design in which the main column spacers are formed using vertical bump column spacer configurations and in which the subspacer column spacers are formed using horizontal bump column spacer configurations. This type of configuration is shown in FIG. 9 in which main column spacer 108A has a vertical bump configuration and in which subspacer 108B has a horizontal bump configuration.

Figure 9:
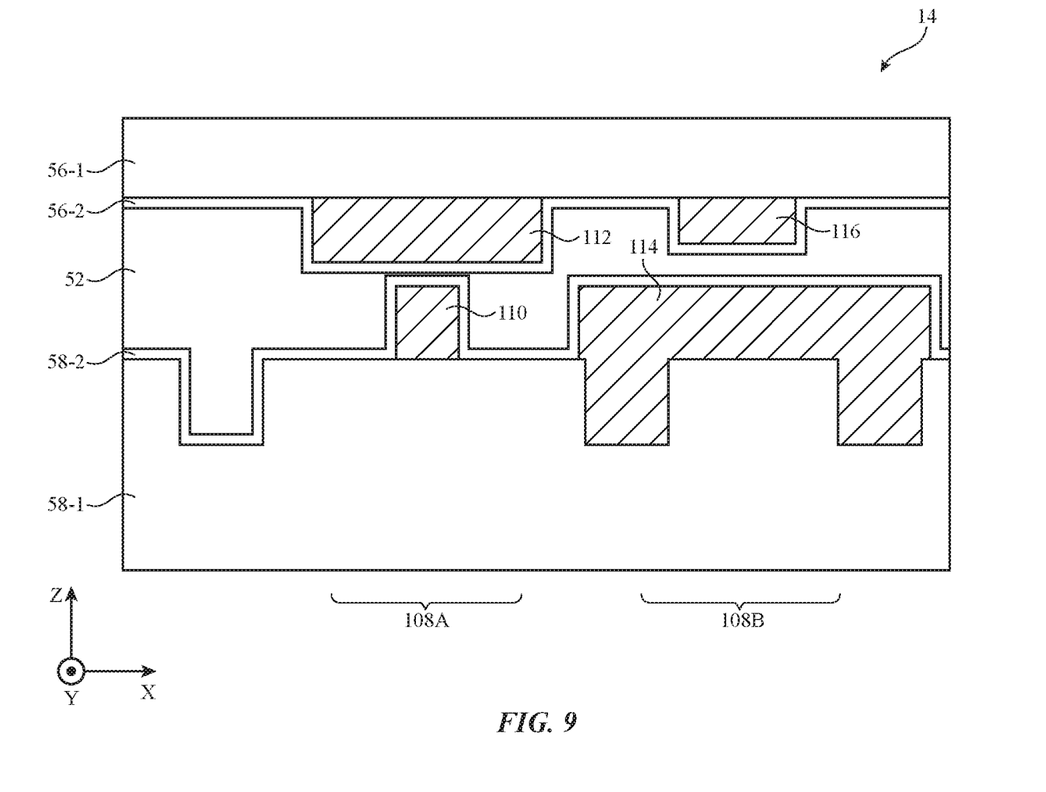
FIG. 9 is a cross-sectional side view of an illustrative display in which a column spacer has a portion that covers and fills contact holes in the planarization layer of a thin-film transistor layer in accordance with an embodiment.
Figure 10:
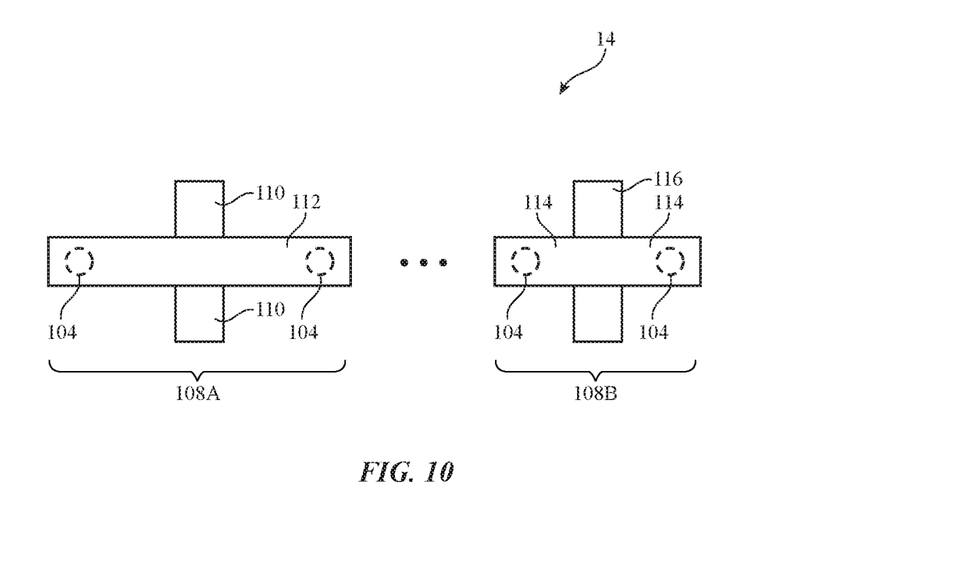
FIGS. 10 and 11 are top views of illustrative column spacer designs in accordance with embodiments.
Figure 11:
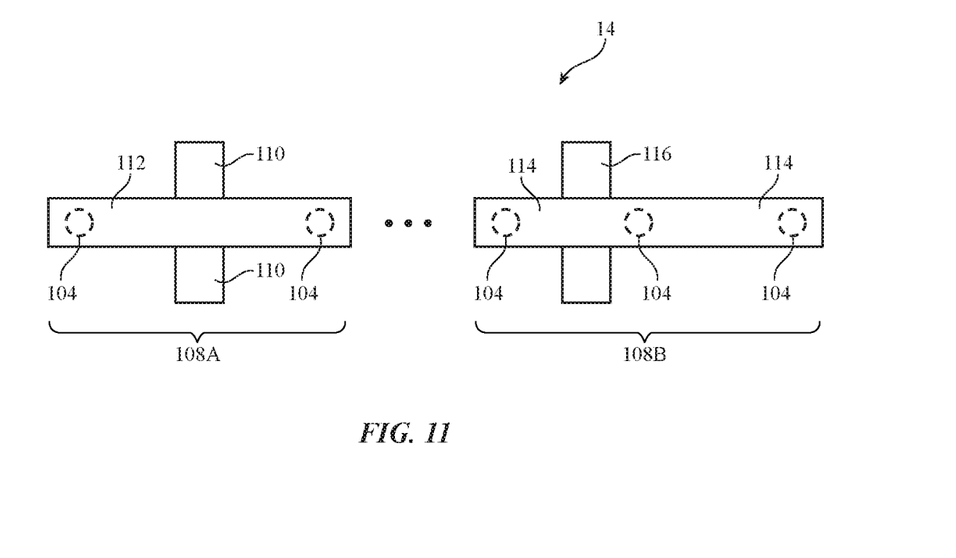

As shown in FIG. 9 and as illustrated in the top view of FIG. 10, portion 114 may overlap and fill contact holes 104 (e.g., a pair of adjacent contact holes 104), thereby helping to improve uniformity for alignment layer 58-2. If desired, portions 114 may extend sufficiently to cover three or more contact holes 104 (see, e.g., portion 114 in illustrative subspacer 108B of display 14 of FIG. 11). As illustrated in FIGS. 10 and 11, portions 110 and 112 extend perpendicular to each other to form cross-shaped main column spacers 108A and portions 114 and 116 may extend perpendicular to each other to form cross-shaped subspacers 108B (as an example).

Figure 12:
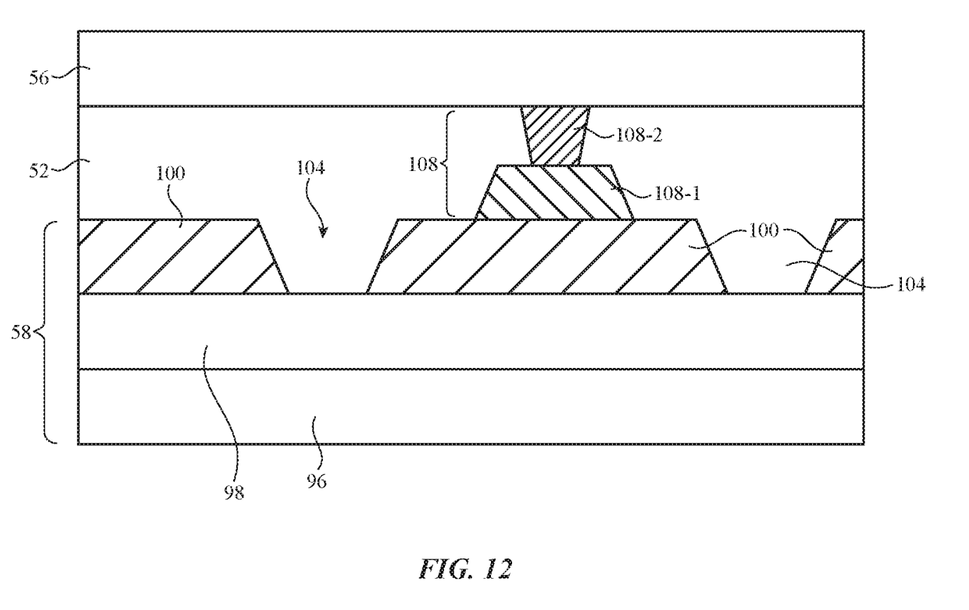
FIG. 12 is a cross-sectional side view of an illustrative display in which a portion of a column spacer on a planarization layer in a thin-film transistor layer has been formed from thin-film transistor layer planarization layer material in accordance with an embodiment.

If desired, column spacer structures on thin-film transistor layer 58 may be formed from the same material as planarization layer 100 (e.g., positive photoresist such as positive acrylic photoresist or other photoimageable polymer). This reduces process complexity and facilitates fabrication. An illustrative display with this type of column spacer is shown in FIG. 12. As shown in FIG. 12, planarization layer 100 may be formed on thin-film circuitry 98 and substrate 96. Column spacer 108 (a main column spacer or subspacer) may have thin-film-transistor layer portion 108-1 on layer 100 of layer 58 and may have color filter layer portion 108-2 on color filter layer 56. Portion 108-1 may be formed from the same material as layer 100.

Figure 13:
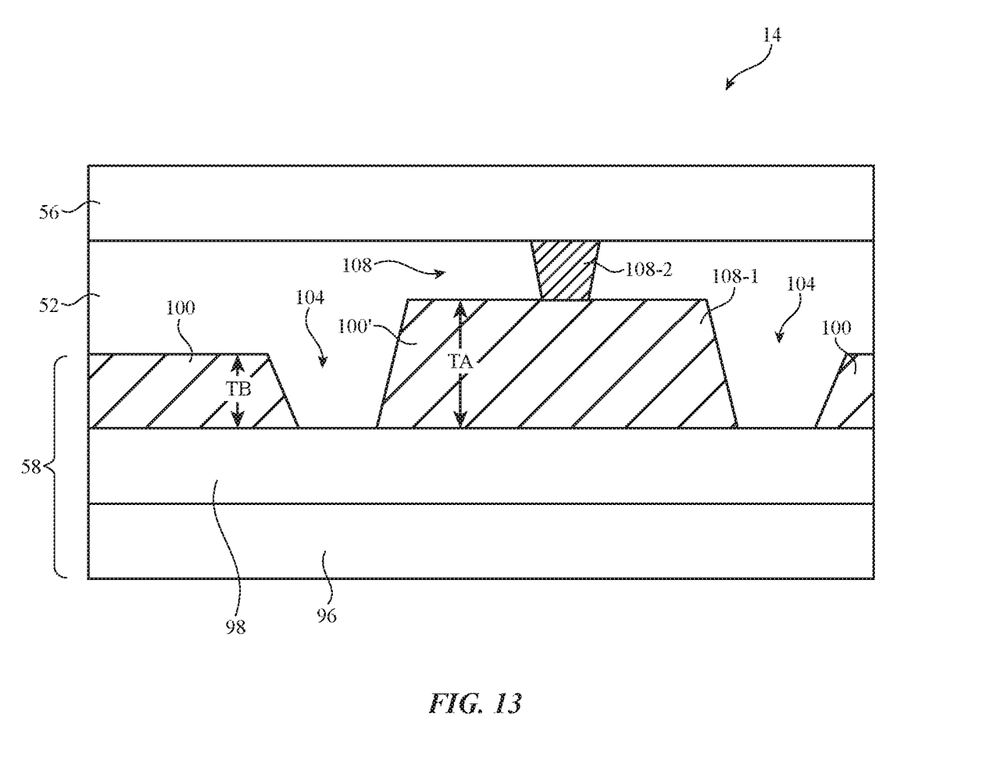
FIG. 13 is a cross-sectional side view of an illustrative display in which a thin-film transistor layer has a planarization layer that has been patterned with a half-tone mask so that regions of the planarization layer locally thickened and serve as portions of column spacers in accordance with an embodiment.

In the illustrative configuration of FIG. 13, planarization layer 100 has been photolithographically patterned using a half-tone photolithographic mask. The half-tone mask exposes portion 100' of planarization layer 100 under column spacer portion 108-1 of column spacer 108 differently than the rest of layer 100, so that, following development, planarization layer portion 100' has a thickness TA that is greater than the thickness (TB) of layer 100 elsewhere in display 14. As a result, the column spacer portion 108-2 is formed as an integral portion of thickened planarization layer portion 100'.

If desired, column spacers 108 may have circular shapes. As shown in FIG. 14, for example, column spacer 108 may have a first circular portion (portion CF) that is formed on color filter layer 56 and a second circular portion (portion TFT) that is formed on thin-film-transistor layer 58. The circular shapes of portions CF and TFT may help ensure a constant contact area between the upper and lower portions of the column spacer even when layers 56 and 58 are slightly misaligned.

The foregoing is merely illustrative and various modifications can be made by those skilled in the art if desired.

What is claimed is:

1. A display having perpendicular first and second lateral dimensions, comprising:
    a color filter layer having an inner surface that lies plane parallel to a plane defined by the first and second lateral dimensions and an opposing outer surface;
    a thin-film transistor layer having an outer surface and having an opposing inner surface that faces the inner surface of the color filter layer;
    a layer of liquid crystal material between the color filter layer and the thin-film transistor layer;
    main column spacers each of which has a first elongated portion on the inner surface of the thin-film transistor layer having a length along the first lateral dimension and having a width along the second lateral dimension that is shorter than its length and a second elongated portion on the inner surface of the color filter layer having a length along the second lateral dimension and having a width along the first lateral dimension that is shorter than its length, wherein the first elongated portion of each main column spacer is separated from the second elongated portion of that main column spacer by a first distance; and subspacers each of which has a first elongated portion on the inner surface of the thin-film transistor layer having a length along the second lateral dimension and having a width along the first lateral dimension that is shorter than its length and a second elongated portion on the inner surface of the color filter layer having a length along the first lateral dimension and having a width along the second lateral dimension that is shorter than its length, wherein the first elongated portion of each subspacer is separated from the second elongated portion of that subspacer by a second distance, wherein the second distance is less than the first distance.

2. The display defined in claim 1 wherein the thin-film transistor layer comprises a substrate layer, thin-film transistor circuitry on the substrate layer, and a planarization layer on the thin-film transistor circuitry.

3. The display defined in claim 2 further comprising contact holes.

4. The display defined in claim 3 wherein the first elongated portion of each subspacer fills at least one of the contact holes.

5. The display defined in claim 3 wherein the first elongated portion of each subspacer fills three of the contact holes.

6. The display defined in claim 3 further comprising indium-tin-oxide electrodes on the planarization layer.

7. The display defined in claim 6 further comprising indium-tin-oxide structures in at least part of the contact holes.

8. The display defined in claim 1 wherein the first elongated portion of each of the main column spacers and the second elongated portion of each of the main column spacers have rectangular outlines.

9. The display defined in claim 8 wherein the first elongated portion of each of the subspacers and the second elongated portion of each of the subspacers have rectangular outlines.

10. The display defined in claim 9 wherein the first and second elongated portions of each of the subspacers do not contact each other in absence of pressure that compresses the layer of liquid crystal material between the inner surface of the color filter layer and the inner surface of the thin-film transistor layer.

11. The display defined in claim 1 further comprising polymer alignment layers on the inner surface of the color filter layer and the inner surface of the thin-film transistor layer.

12. The display defined in claim 11 wherein the thin-film transistor layer comprises the planarization layer with contact holes and wherein at least some of the contact holes are filled with a polymer other than polymer from the polymer alignment layers.

13. A display, comprising:
a color filter layer having an inner surface and an opposing outer surface;
a thin-film transistor layer having an outer surface and having an opposing inner surface that faces the inner surface of the color filter layer, wherein the thin-film transistor layer comprises a substrate layer, thin-film transistor circuitry on the substrate layer, and a planarization layer on the thin-film transistor circuitry;
contact holes which extend from the inner surface of the thin-film transistor layer through a portion of the thin-film transistor layer;
a layer of liquid crystal material between the color filter layer and the thin-film transistor layer;
subspacers that each have a color filter layer portion that is formed on the inner surface of the color filter layer and that extends along a first lateral dimension and have an opposing thin-film-transistor layer portion that is formed on the thin-film transistor layer and that extends along a second lateral dimension, wherein one of the thin-film-transistor layer portions fills first and second contact holes and wherein the first and second contact holes are in an active area of the display; and
main column spacers that each have a color filter layer portion that is formed on the inner surface of the color filter layer and that extends along the second lateral dimension and have an opposing thin-film-transistor layer portion that is formed on the thin-film transistor layer and that extends along the first lateral dimension.

14. The display defined in claim 13 wherein the color filter layer comprises red, blue, and green color filter elements and wherein the thin-film transistor layer has chevron-shaped electrodes.

15. A display, comprising:
a color filter layer having an inner surface and an opposing outer surface;
a thin-film transistor layer having an outer surface and having an opposing inner surface that faces the inner surface of the color filter layer, wherein the thin-film transistor layer comprises a substrate layer, thin-film transistor circuitry on the substrate layer, a planarization layer over the thin-film transistor circuitry;
contact holes which extend from the inner surface of the thin-film transistor layer through a portion of the thin-film transistor layer;
a layer of liquid crystal material between the color filter layer and the thin-film transistor layer;
main column spacers, wherein each of the main column spacers comprises:
a first elongated portion on the inner surface of the thin-film transistor layer that extends along a first lateral dimension; and
a second elongated portion on the inner surface of the color filter layer that extends along a second lateral dimension; and
subspacers, wherein each of the subspacers comprises:
a first elongated portion on the inner surface of the thin-film transistor layer that extends along the second lateral dimension and that at least partially fills at least two of the contact holes; and
a second elongated portion on the inner surface of the color filter layer that extends along the first lateral dimension.

16. The display defined in claim 13 further comprising:
an alignment layer on the thin-film transistor layer, wherein the alignment layer extends into a third contact hole and the one of the thin-film-transistor layer portions is interposed between the alignment layer and the first and second contact holes.

* * * * *